May 16, 1939. J. C. BULLEN 2,158,532
COMPLEMENTARY ROTARY ENGINE
Filed Feb. 25, 1936 4 Sheets-Sheet 1
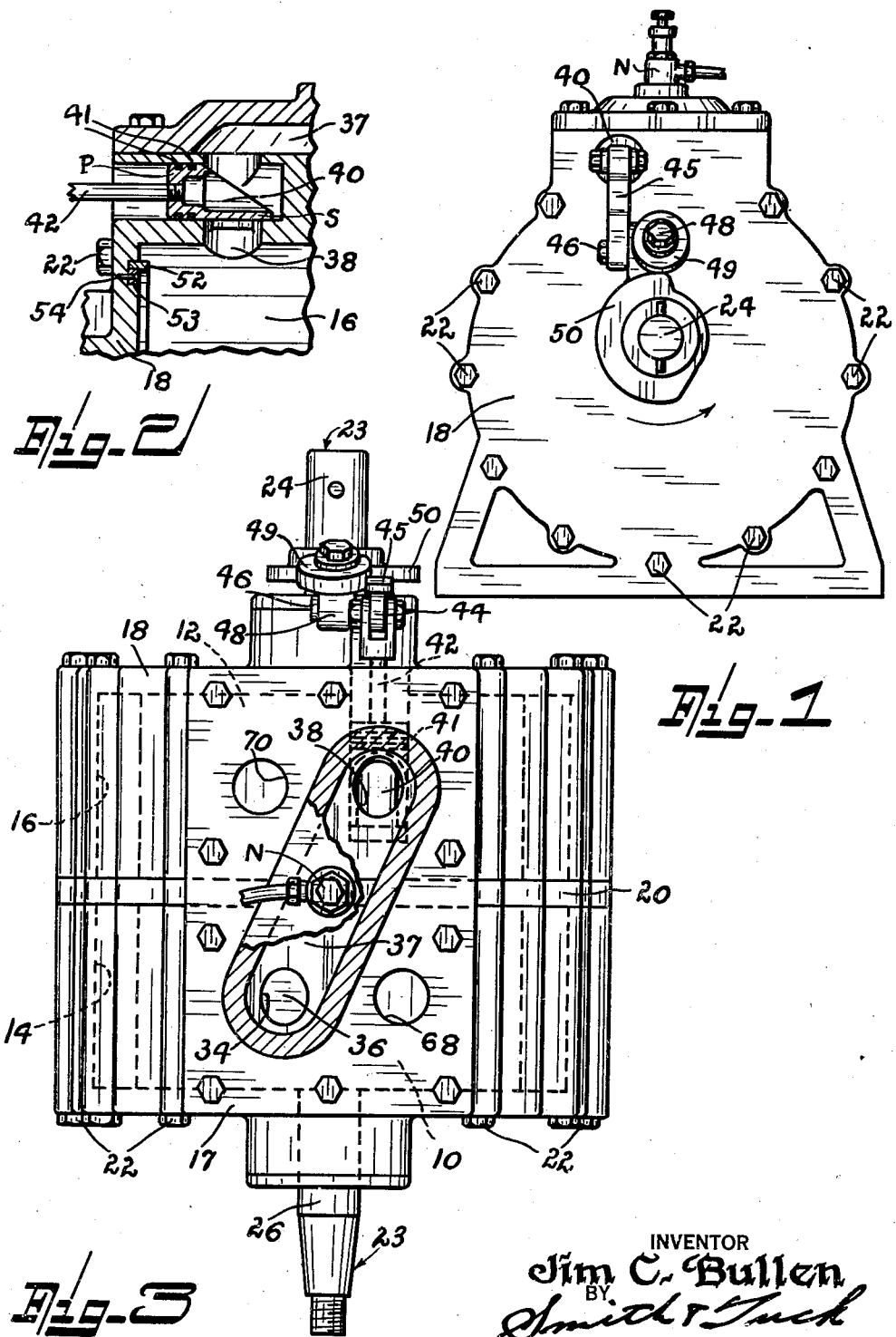
INVENTOR
Jim C. Bullen
BY
Smith & Tuck
ATTORNEYS May 16, 1939.  J. C. BULLEN  2,158,532
COMPLEMENTARY ROTARY ENGINE
Filed Feb. 25, 1936  4 Sheets-Sheet 2
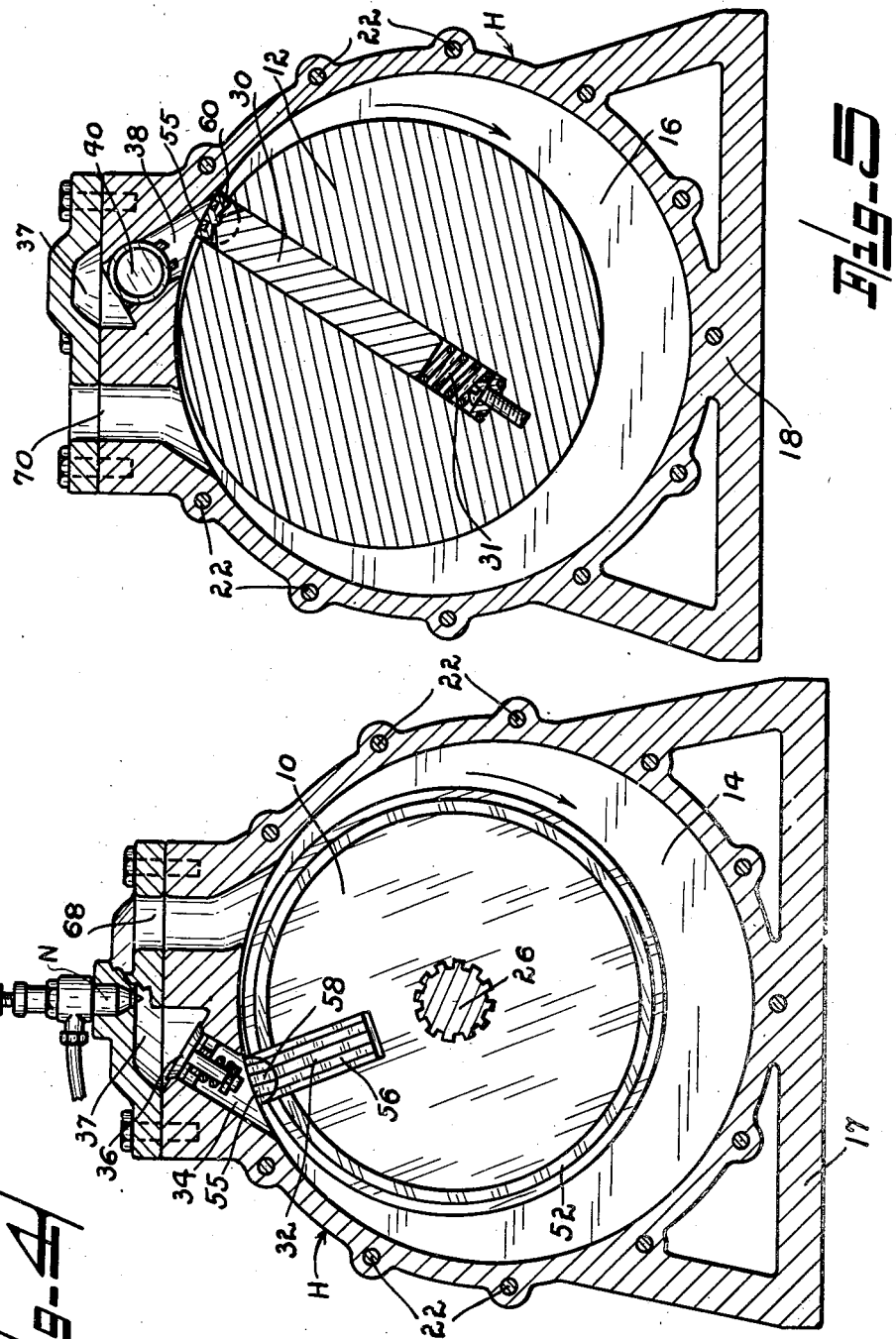
INVENTOR
Jim C. Bullen
BY
Smith & Tuck
ATTORNEYS

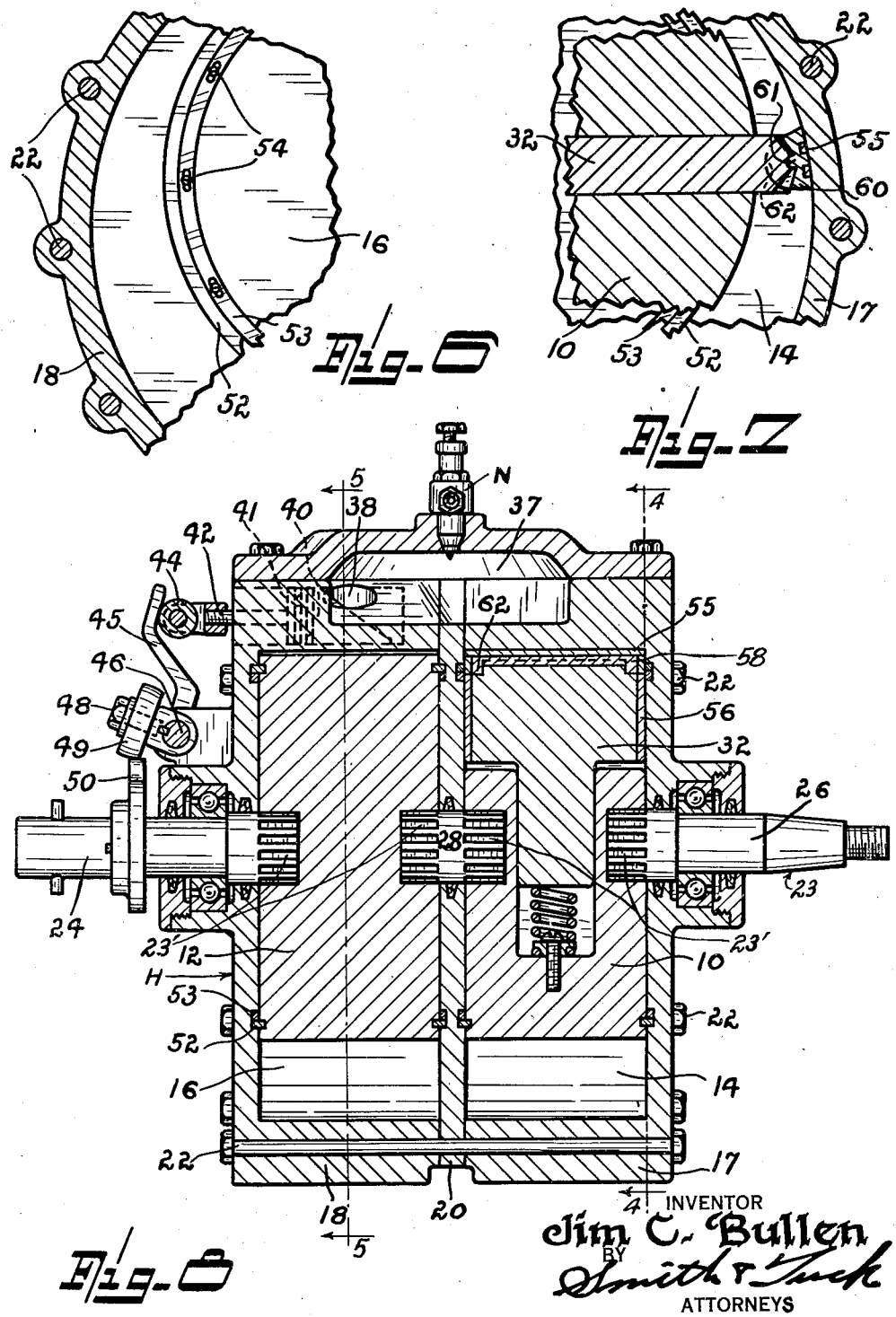

May 16, 1939.  J. C. BULLEN  2,158,532
COMPLEMENTARY ROTARY ENGINE
Filed Feb. 25, 1936  4 Sheets-Sheet 4
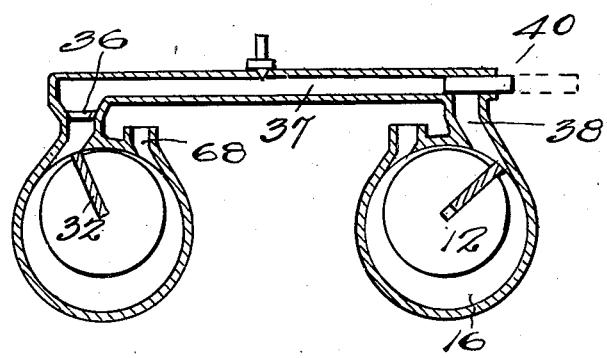
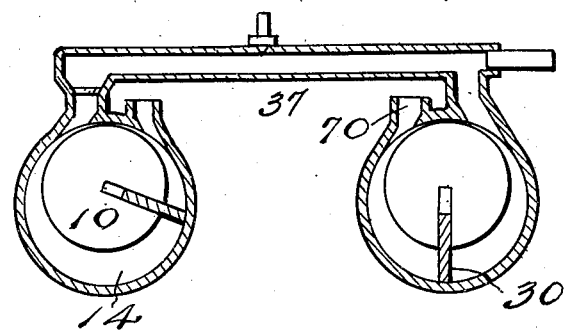
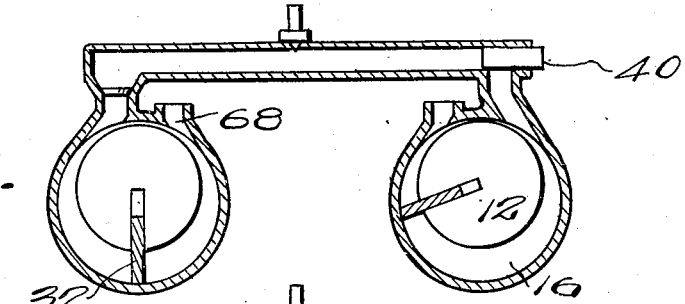
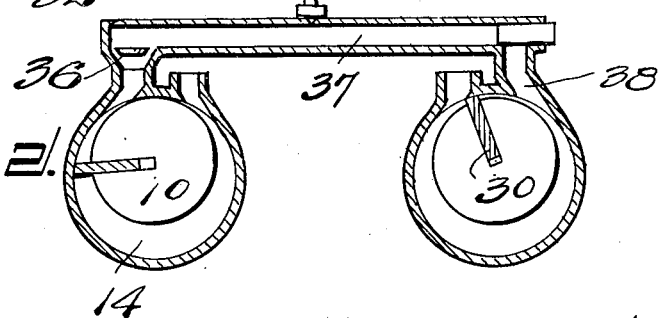
Inventor
Jim C. Bullen
By Smith + Tuck
Attorneys Patented May 16, 1939

2,158,532

UNITED STATES PATENT OFFICE 2,158,532

COMPLEMENTARY ROTARY ENGINE

Jim C. Bullen, Thorp, Wash.

Application February 25, 1936, Serial No. 65,706

2 Claims. (Cl. 123—16)

My present invention relates to the art of internal combustion engines and more particularly to a complementary rotary engine.

For many years designers have been endeavoring to create a rotary internal combustion engine which would give the advantages theoretically possible with such a type and have produced a wide variety of rotary motors, those observed have been of complicated construction and not readily lending themselves to the full cycle of operation which has been determined from years of trial as most desirable in an internal combustion engine. With my present motor, I believe I have overcome many of the deficiencies of past equipment of this order. In this design I have provided a compressor rotor and a power rotor to the end that the charge, whether it be air or a mixture of fuel and air, can be compressed to the desired compression ratio and then utilized in the power cylinder, either by firing as with a spark plug or by the injection of fuel following the teachings of the Diesel principles.

To accomplish this purpose it has been necessary to provide valve arrangements of unusual character so that they can be maintained in a serviceable condition over long periods of operation. It has further been necessary to provide sealing means for the rotors so that the same may be sealed secure against leakage without creating undue friction or wear. Further, I have made arrangement in my design so that the compressor rotor can be in a slightly different phase relation to the power rotor and this can be adjusted to take care of various running conditions as to speed, particularly, so that it is possible to scavenge the firing chamber and thus gain in volumetric efficiency.

Other and more specific objects will be apparent from the following description taken in connection with the accompanying drawings, wherein Figure 1 is an end elevation of a motor made after the teachings of my invention.

Figure 2 is a detailed view of the transfer valve used with my present design.

Figure 3 is a top plan view of my motor certain parts being broken away to better illustrate the construction of the transfer head arrangement.

Figure 4 is a cross-sectional view through the compressor rotor of my engine, taken as at line 4—4 of Fig. 8.

Figure 5 is a cross-sectional view through the power rotor of my engine, taken as at line 5—5 of Fig. 8.

Figure 6 is a fragmentary face view of the interior of one of my rotary chambers.

Figure 7 is a fragmentary view illustrating the sealing means for the side of my rotor and for the bearing surface of the vanes employed in my power rotor.

Figure 8 is a vertical sectional view taken along the longitudinal axis of my engine illustrating the arrangement of my transfer head and the manner in which the compressor and power rotors are supported and sealed.

Figures 9 to 12 inclusive are diagrammatic views illustrating the cycles of operation of the rotary engine of my invention wherein Fig. 9 shows the compressor rotor with its valve closed, ready to compress a charge of air; a compressed fuel charge in the firing chamber; and a previously fired charge being exhausted by the power rotor while its valve is closed. Fig. 10 shows a charge of air being compressed by the compressor rotor, its valve still being closed; the fuel charge in the firing chamber being fired; and the previously fired charge starting to rotate the power rotor, its valve now being open. Fig. 11 shows a charge of air compressed by the compressor rotor and its valve about to open under the compression; the fired charge leaving the firing chamber and expanding and rotating the power rotor its valve still being open. Fig. 12 shows the compressed charge of air being forced into the firing chamber by the compressor rotor its valve still being open, and a new air charge being drawn in by the rotor vane; the firing chamber being cleared or scavenged of gases by the onrushing charge of air through the power rotor valve which is still open but which will close after only an instant, after which a new fuel charge will be mixed with the compressed air; the power rotor having exhausted the previous charge, and approaching the position where it will be rotated by the next fired fuel charge from the firing chamber.

Referring to the drawings, throughout which like reference characters indicate like parts, 10 designates the compressor rotor and 12 designates the power rotor. These rotors are enclosed within compressor chambers 14 and power chamber 16 respectively by the housing H which consists of a compressor end bell 17, a power cylinder end bell 18, and a separator or division plate 20, disposed between the two bells. The entire assembly is held together by a plurality of through bolts 22. The rotors are supported on a built up power shaft 23 consisting of the starter stub 24, the flywheel stub 26, and the intermediate stub 28. The axis of the stub shafts form a single line, that is eccentrically mounted with respect to chambers 14 and 16 but is concentric with rotors 10 and 12. In this manner the revolving weights are in static balance, thus making for smooth running. The stub-shaft arrangement for the power shaft is made necessary by virtue of the fact that it is desirable to have the vane 30 of considerable extent so that adequate sealing may be arranged for.

Vane 30 is forced outwardly by spring 31 which is preferably secured within the rotor in such a manner that it will urge the vane outwardly in contact with the housing. Normally, however, centrifugal force set up in the rapid revolution of the rotors will cause vane 30 to engage the housing.

I have indicated the power stub shafts as being secured within the rotor by means of splined ends 23'. This makes a secure and desirable arrangement. Particularly is the splinning desirable on the stub shaft 28 in that it gives ample opportunity for adjustment of the angular disposition between the two rotors so that adjustment may be effected and assure the more effective lead for the desired speed of operation.

Throughout my present drawings I have illustrated a Diesel injection nozzle N which would be supplied by fuel under pressure and the timing of the same synchronized with the power shaft by means not illustrated, as it is felt such constructions are so well known that it would only serve to complicate the present showing.

Referring to Figure 4, more particularly, the compressor rotor 10 is provided with a vane 32 serving the same general purpose as vane 30 in the power cylinder but, because of the reduced pressure it operates against it, it need not be of the massive construction which the long guiding required in the power cylinder makes necessary. Communicating with compression chamber 14 is the transfer or firing chamber intake valve passageway 34 in which is disposed the automatic, spring-loaded valve 36 adapted to retain the compressed air charge in the chamber 14 until the degree of compression reaches a predetermined point. The combined transfer and firing chamber 37 is of sufficient extent to bridge over the openings between the compressor chamber 14 and the power chamber 16. Communicating with chamber 16 is the firing chamber outlet passage 38 and controlling this passageway is the piston valve 40 which acts as an outlet valve for the firing chamber 37 and the intake valve for the power chamber 16. This valve and its operating means is best illustrated in Figures 1, 2 and 8.

The valve 40 is formed as a piston and includes the piston head P having sealing rings 41 and piston rod 42. To the rear of the piston head P and adapted to alternately close the passage 38 I provide the piston skirt S. This skirt S is cut diagonally from a point adjacent the head to the rear extremity of the skirt thus forming to the rear of the piston head a concave surface to receive the fired charge. The charge will, of course, force the piston valve, when in operable position, to the left in Fig. 2 thus opening the passage 38 and admitting the fired fuel charge to the power chamber and the rotor therein. The valve is actuated by gas pressure built up within chamber 37 but is controlled and held against movement by the lever and cam arrangement best shown in Figures 1, 3 and 8. This consists of the piston rod 42 having mounted on its outer end a bearing 44. This in turn bears against lever 45. Lever 45 is connected through shaft 46 to a roller supporting arm 48, bearing roller 49. This roller is in contact with cam 50 and thus, in turn, normally closes valve 40 and permits it to be opened by the pressure of internal gases only when the proper time to complete the firing cycle has arrived. Cam 50 is fixedly secured to shaft 24 and, of course, turns at engine speed.

In engines of this general character, particularly if they rotate at high speed, there is involved a difficult sealing problem, one that will prevent the unwanted flow of gases but which will, at the same time, not of itself create undue friction and wear. Throughout my present design I have provided sealing means which normally will be constructed of material which will itself absorb the wear rather than causing wear on the rotor or housing. This sealing follows the general theory of piston rings. The sealing of the rotors is accomplished by a clamping ring, as 52, secured within the rotor and adapted to bear upon a bearing ring 53. Bearing ring 53 is secured to the housing by a plurality of screws 54. These rings 53 are only slightly smaller in diameter than the rings 52 themselves. Naturally rings 52 take pressure from the leakage past the side walls of the rotors and the tendency is for the gas pressure to force ring 52 against rings 53, thus any wear that might be occasioned is assumed by the easily replaceable rings 53.

Vanes 30 and 32 require sealing strips as 55 along the outer face of the members and radially disposed sealing strips 56 along the sides of the vanes. These sealing strips function after the manner of piston rings, being fitted in slots and preferably being spring pressed against the sides, preferably by curvature within the metal or, as is common with certain types of piston rings, by actual spring pressure back of the same.

It will be apparent it is believed that inasmuch as the axis of shafts 24, 26, 28 is eccentrically disposed with respect to the chambers 14 and 16, it is necessary to have an adjustable bearing plate on the extreme end of the vanes. This is taken care of by the means shown in Figures 4 and 5 wherein bearing members 58 and 60 are employed which are free to assume the angular relationship required with vanes 32 and 30 so that it can bear fully upon the inner surface of chambers 14 and 16. These are provided in turn with a centering bearing member 61 and has downwardly extending lips as 62 disposed on either end of members 58 and 60 so as to better effect a seal. These members are arranged so that they can bear fully upon the inner surface of chambers 14 and 16 throughout the full revolution of the rotors within the chambers. This construction while really necessary to provide an adequate seal, also has the advantage of providing an easily replaceable wearing member to take up any excessive wear that might occur in the piston and should preferably be made of material that is softer than the material from which the housing is made.

*Method of operation*

In operating my motor air is taken into chamber 14 through the air intake port 68; referring specifically to Figure 4 the showing illustrates the showing of the rotor at the conclusion of one intake stroke and the charge which was taken in on the preceding stroke has been forced past valve 36 into the compression or firing chamber 37, where it is retained under full compression.

Referring now to Figure 5 the power stroke is just ready to start. In this position cam 50 is releasing the locking means for valve 40 thus allowing the fired charge, in the case of a gas engine, or the highly compressed air into which the fuel injection is starting as in a Diesel cycle, to pass through valve 40 which has been forced open by the firing of the charge into passage 38 so that it can apply its full force against the vane 30. As the rotor 12 continues around in the direction of the arrow it will expose more and more of the vane to the action of the gases so that there will be a gradual acceleration of effort which will reach its peak when vane 30 is at the lowermost part of chamber 16. The power stroke will then continue until vane 30 passes over the beginning of the exhaust passage 70 where free exhaust to the atmosphere will occur.

Now it has been found most desirable to have the angular relationship between rotor 10 and rotor 12 such that as soon as vane 30 connects the exhaust to port 70, valve 40, still being open, rotor 10 will be in such a position that vane 32 will be near the bottom of chamber 14. This will build up sufficient pressure ahead of vane 32 so that air will be forced past valve 36. This air will have a free flow through chamber 37 and out through valve 40 into the power chamber 16. This provides a degree of cooling and scavenging of chamber 37 that is found to be highly desirable and, at the same time, provides for an increase in volumetric efficiency of the engine. This cycle is repeated for each revolution of the rotor shaft and supplies a long application of the power stroke amounting to about 300 degrees of angular travel.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

I claim:

1. In a rotary internal combustion engine, the combination of a casing and its partition forming a power chamber and a compression chamber, a rotor in one chamber having a power shaft journaled in one wall of the casing, a rotor in the other chamber having a shaft journaled in an opposite wall of the casing, an intermediate shaft for said rotors journaled in the partition, and co-acting locking means on the opposite ends of the intermediate shaft and said rotors for securing adjustable phase relation between the rotors.

2. In a rotary internal combustion engine, the combination of a casing and its partition forming a power chamber and a compression chamber, a rotor in one chamber having a power shaft journaled in one wall of the casing, a rotor in the other chamber having a shaft journaled in an opposite wall of the casing, an intermediate shaft for said rotors journaled in the partition, and a plurality of co-acting locking splines on said shafts and said rotors for securing adjustable phase relation between said rotors.

JIM C. BULLEN.